United States Patent
Borrello (10) Patent No.: US 10,754,358 B2
(45) Date of Patent: Aug. 25, 2020

(54) METHODS AND SYSTEMS FOR CONTROLLING GAS FLOW USING A PROPORTIONAL FLOW VALVE

(71) Applicant: KONINKLIJKE PHILIPS N.V., Eindhoven (NL)

(72) Inventor: Michael Anthony Borrello, Carlsbad, CA (US)

(73) Assignee: Koninklijke Philips N.V., Eindhoven (NL)

(*) Notice: Subject to any disclaimer, the term of this patent is extended or adjusted under 35 U.S.C. 154(b) by 113 days.

(21) Appl. No.: 15/763,336

(22) PCT Filed: Sep. 7, 2016

(86) PCT No.: PCT/IB2016/055321
§ 371 (c)(1),
(2) Date: Mar. 26, 2018

(87) PCT Pub. No.: WO2017/055948
PCT Pub. Date: Apr. 6, 2017

(65) Prior Publication Data
US 2018/0307254 A1    Oct. 25, 2018

Related U.S. Application Data

(60) Provisional application No. 62/233,489, filed on Sep. 28, 2015.

(51) Int. Cl.
G05D 7/06 (2006.01)
G05B 13/04 (2006.01)
F15B 19/00 (2006.01)

(52) U.S. Cl.
CPC ......... *G05D 7/0635* (2013.01); *F15B 19/002* (2013.01); *G05B 13/04* (2013.01); *F15B 2211/6654* (2013.01)

(58) Field of Classification Search
CPC ............. G05D 7/0635; F15B 19/002; F15B 2211/6654; G05B 13/04
(Continued)

(56) References Cited

U.S. PATENT DOCUMENTS 5,303,698 A    4/1994 Tobia et al.
6,445,980 B1 * 9/2002 Vyers .............. G05B 11/42
                                                           318/609
(Continued)

FOREIGN PATENT DOCUMENTS

EP         0798005 A2    10/1997

OTHER PUBLICATIONS

S. Kaitwanidvilai, M. Parnichkun, "Force control in a pneumatic system using hybrid adaptive neuro-fuzzy model reference control," sciencedirect.com, Mechatronics, vol. 15, Issue 1, 2005, Retrieved from the internet on Sep. 2019. (Year: 2005).*

(Continued)

*Primary Examiner* — Kenneth M Lo
*Assistant Examiner* — Mohammed Shafayet
(74) *Attorney, Agent, or Firm* — Daniel H. Brean (57) ABSTRACT

A method (400) for controlling a proportional valve. The method includes the steps of: (i) providing (410) a proportional flow valve system that includes: a closed loop flow controller (110) including a proportional flow control valve (140), a flow sensor (150), and an adjustable gain (180); and an adaptive controller (120) including a model (160) of the closed loop flow controller, and a gain control (170); (ii) actuating (420) the proportional flow control valve; (iii) measuring (430) actual gas flow; (iv) determining (440) a difference between the measured gas flow rate and a desired gas flow rate; (v) adjusting (450) the proportional flow valve using the determined difference; (vi) initiating (460) a response from the model of the closed loop flow controller;

(Continued)

(vii) determining (470) a gain for the closed loop flow controller; and (viii) adjusting (480) the adjustable gain of the closed loop flow controller.

10 Claims, 4 Drawing Sheets

(58) Field of Classification Search
USPC .......................................................... 700/282
See application file for complete search history.

(56) References Cited

U.S. PATENT DOCUMENTS

| | | | |
|---|---|---|---|
| 2003/0105536 A1* | 6/2003 | Corbelli | G05B 13/042 700/19 |
| 2003/0199997 A1* | 10/2003 | Gao | G05B 5/01 700/18 |
| 2005/0288825 A1* | 12/2005 | Tinsley | G05D 7/0635 700/282 |
| 2006/0225737 A1* | 10/2006 | Iobbi | A61M 16/0677 128/204.21 |
| 2007/0215154 A1* | 9/2007 | Borrello | A61M 16/0096 128/204.21 |
| 2008/0140260 A1* | 6/2008 | Ding | G01F 1/68 700/282 |
| 2009/0082883 A1* | 3/2009 | Francis | G05B 11/42 700/33 |
| 2009/0143872 A1* | 6/2009 | Thiele | G05B 13/048 700/30 |
| 2009/0198350 A1* | 8/2009 | Thiele | G05B 13/042 700/30 |
| 2010/0049461 A1 | 2/2010 | Lull | |
| 2011/0125293 A1* | 5/2011 | Havlena | G05B 13/048 700/30 |
| 2011/1006011 | 5/2011 | Cinar et al. | |
| 2011/0191038 A1* | 8/2011 | Lull | G01F 1/6847 702/47 |
| 2011/0230981 A1* | 9/2011 | Karpman | G05B 13/04 700/30 |
| 2013/0041482 A1* | 2/2013 | Badwe | G05B 13/048 700/29 |
| 2015/0267619 A1* | 9/2015 | Khalid | B64C 11/305 701/100 |
| 2016/0003665 A1* | 1/2016 | Valentine | G01F 25/0007 73/1.16 |
| 2016/0131057 A1* | 5/2016 | Lahti | F02D 41/0077 701/103 |
| 2016/0131089 A1* | 5/2016 | Lahti | F02D 41/0007 60/605.2 |
| 2016/0170384 A1* | 6/2016 | Charest-Finn | G05B 13/026 700/44 |
| 2016/0243916 A1* | 8/2016 | Kubota | B60G 17/015 |

OTHER PUBLICATIONS

Bursi et al: "Analysis of a Discrete First-Order Model Reference Adaptive Controller Discretized by the Zero-OPRDER-Hold Discrete Equivalent"; 4th World Conference on Structural Control and Monitoring, 4WCSCM-066,Jan. 2006, pp. 1-8.

Hoagg et al: "Retrospective Cost Model Reference Adaptive Control for Nonminimum-Pase Discrete-Time Systems, Part 2: Stability Analysis"; 2011 American Control Conference, San Francisco, CA, Jun. 29-Jul. 1, 2011, AACC, pp. 2927- 2932.

Hoagg et al: "Retrospective Cost Model Reference Adaptive Control for Nonminimum-Phase Discrete-Time Systems, PART1: The Adaptive Controller"; 2011 American Control Conference, San Francisco, CA, Jun. 29-Jul. 1, 2011, AACC, pp. 2933-2938.

Stepanyan et al: "MRAC Revisited: Guaranteed Performance With Reference Model Modification"; 2010 American Control Conference, Baltimore, MD, Jun. 30-Jul. 2, 2010, pp. 93-98.

Westermaier et al: "Controlling the Loop-Gain for Robust Adaptive Control of a Mechatronic System"; 6 Page Document, ICTA 2005.

Bursi, O.S. et al., "Analysis of a Discrete First Order Model Reference Adaptive Controller Discretized by the Zero-Order-Hold Discrete Equivalent", 4th World Conference on Structural Control and Monitoring, Jan. 31, 2006. XP055318061.

\* cited by examiner

METHODS AND SYSTEMS FOR CONTROLLING GAS FLOW USING A PROPORTIONAL FLOW VALVE

CROSS-REFERENCE TO PRIOR APPLICATIONS

This application is the U.S. National Phase application under 35 U.S.C. § 371 of International Application No. PCT/IB2016/055321, filed on Sep. 7, 2016, which claims the benefit of U.S. Provisional Patent Application No. 62/233,489, filed on Sep. 28, 2015. These applications are hereby incorporated by reference herein.

FIELD OF THE INVENTION

The present disclosure is directed generally to methods and systems for precision control of a proportional flow valve.

BACKGROUND

Precise control of electrically-controlled proportional flow valves presents a significant challenge, especially when the flow valve is expected to precisely follow an arbitrary trajectory over time, or when the trajectory has rapid acceleration over different ranges of flow. Typical valve characteristics are such that sensitivity of flow to command is very low at the low flow range and much higher at the higher flow range. Because this difference in sensitivity can often be several orders of magnitude, precise control of a proportional flow valves over the full range of possible flow rates is problematic.

In an attempt to provide precision and accuracy, proportional flow valve designers have applied feedback into valve positioning controls that measure and analyze the outlet flow of the valve. With such large differences in valve sensitivity ordinary closed loop controls tend to respond differently depending on what range of flow they are commanded to operate. Accordingly, proportional flow valve designers often modify the control loop gain according to the current operating flow range, and knowledge of the valve sensitivity. However, this can result in additional problems including, for example, that: (1) a requirement that the valve be calibrated prior to operation to determine its sensitivity profile might be introduced; (2) valve sensitivity profiles may be significantly different over a population of valves; (3) the valve upstream pressure changes or varies, thus changing valve sensitivity; and (4) the valve sensitivity may change after a calibration has been done by such effects as temperature changes, wear of valve mechanical components, or any other disturbing influences that tend to change the valve position to flow profile. Operating the closed loop flow control gain adjustments under an assumed flow sensitivity can lead to poor response behavior, or worse instability if the profile changes, and so this approach can present risk where the flow control is critical such as in life support.

Accordingly, there is a need in the art for a specialized flow valve control method that automatically determines required instantaneous gain adjustments without the need for prior valve profile information. Further, there is a need in the art for simple, direct, and efficient flow valve controls systems and methods that do not require a calibration of the valve.

SUMMARY OF THE INVENTION

The present disclosure is directed to inventive methods and systems for precision control of a proportional flow valve. The inventive methods and systems allow for greater precision without the need for prior valve profile information such as a valve calibration. The methods and systems provide instantaneous control loop gain adjustments. In particular, a closed loop dynamic response is equalized over the full flow range of the valve, thereby providing faster and more accurate tracking for all input trajectories. Accordingly, various embodiments and implementations herein are directed to a method and system in which a model is defined for the system to be controlled, and a controller is systematically derived that minimizes the difference between the assumed model and the actual system by restructuring the actual system dynamics.

Generally in one aspect, a method for controlling a proportional flow valve is provided. The method includes the steps of: (i) providing a proportional flow valve system, the system having: a closed loop flow controller including a proportional flow control valve for a gas source, a flow sensor, and an adjustable gain; and an adaptive controller including a model of the closed loop flow controller, and a gain control; (ii) actuating, by the closed loop flow controller, the proportional flow control valve; (iii) measuring, by the flow sensor, actual gas flow; (iv) determining, by the closed loop flow controller, a difference between the measured gas flow rate and a desired gas flow rate; (v) adjusting the proportional flow valve using the determined difference; (vi) initiating, using the desired gas flow rate, a response from the model of the closed loop flow controller; (vii) determining, using gain control and the response from the model of the closed loop flow controller, a gain for the closed loop flow controller; and (viii) adjusting, using the determined gain, a gain of the closed loop flow controller.

According to an embodiment, the method includes the step of receiving a desired gas flow rate.

According to an embodiment, the step of adjusting the adjustable gain of the closed loop flow controller decreases the difference between the response from the model of the closed loop flow controller and the measured gas flow rate.

According to an embodiment, the gas is oxygen.

According to an embodiment, the proportional flow valve system is a component of a ventilator.

Generally, in one aspect, a proportional flow valve system is provided. The system includes: (i) a gas source; (ii) a proportional flow valve configured to control a gas flow rate from the gas source; (iii) a flow sensor configured to measure a flow of gas from the proportional flow valve; and (iv) a closed loop flow controller including an adjustable gain, where the closed loop flow controller is configured to determine a difference between a measured gas flow rate and a desired gas flow rate, and further configured to adjust the proportional flow valve using the determined difference; and (v) an adaptive controller including a model of the closed loop flow controller, and a gain control, where the adaptive controller is configured to determine a response from the model of the closed loop flow controller, and further configured to determine an adjustment factor for the closed loop flow controller using the gain control, the desired gas flow rate, and the response from the model of the closed loop flow controller.

According to an embodiment, the closed loop flow controller is configured to receive input indicating the desired gas flow rate.

According to an embodiment, adjusting the adjustable gain of the closed loop flow controller decreases the difference between the response from the model of the closed loop flow controller and the measured gas flow rate.

According to an embodiment, the proportional valve flow system is a component of a ventilator.

Generally, in one aspect, a ventilator is provided. The ventilator includes: (i) a gas source; (ii) a proportional flow valve configured to control a gas flow rate from the gas source; (iii) a flow sensor configured to measure the flow of gas from the proportional valve; (iv) a closed loop flow controller including an adjustable gain, where the closed loop flow controller is configured to determine a difference between a measured gas flow rate and a desired gas flow rate, and further configured to adjust the proportional flow valve using the determined difference; and (v) an adaptive controller including a model of the closed loop flow controller, and a gain control, where the adaptive controller is configured to determine a response from the model of the closed loop flow controller, and further configured to determine an adjustment factor for the closed loop flow controller using the gain control, the desired gas flow rate, and the response from the model of the closed loop flow controller.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a method and controller for control of a proportional flow valve system. More generally, Applicant has recognized and appreciated that it would be beneficial to provide a system to precisely control a proportional flow valve over a wide range of flow rates despite significant differences in the sensitivity of the valve to command along that range. Accordingly, the methods described or otherwise envisioned herein provide a specialized flow valve control that automatically determines required instantaneous gain adjustments without the need for calibration or other prior valve profile information.

According to an embodiment, the method is based on a Model Reference Adaptive Control ("MRAC," also known as Model Reference Adaptive System or "MRAS") approach. With MRAC, a system is created with a closed loop controller using parameters that can be updated to change the response of the system, and the output of the system is compared to a desired response from a reference model. The control parameters are then updated based on any detected error or variance, with the ultimate goal being that the parameters of the closed loop controller cause the output of the system to match the response of the reference model. For example, the methods and systems described herein define a model for the flow valve system and a controller is created that minimizes the difference between the model and the actual flow valve system by restructuring the actual system dynamics.

Although the method and system described below is described in connection with precision flow control of compressed gas in critical care ventilators, the methods and systems could be applied to virtually any flow control system using proportional flow valves where the throttling speed of the valve is significantly faster than the desired closed loop bandwidth of the flow controls.

Figure 1:
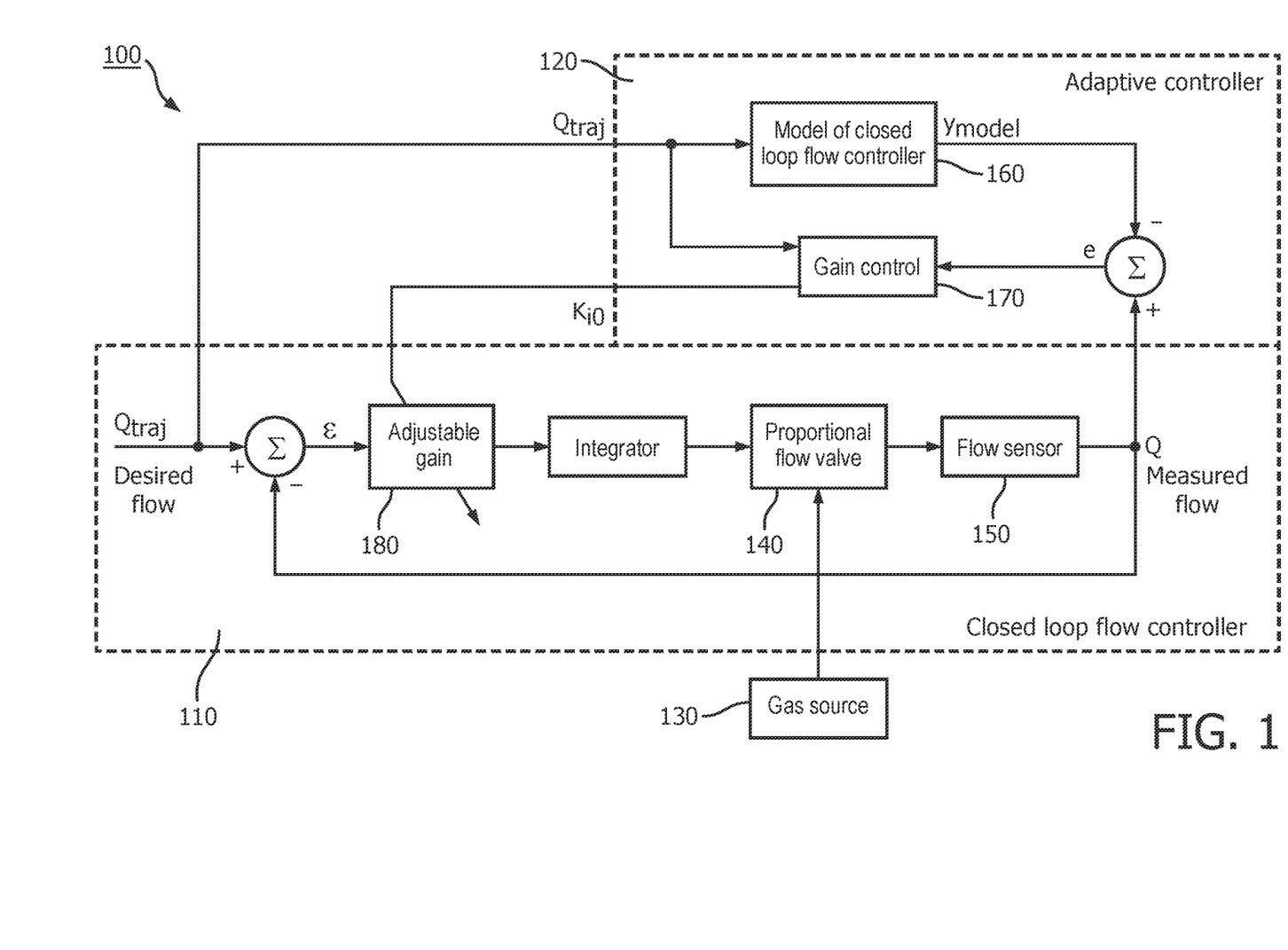
FIG. 1 is a schematic representation of a model for controlling a proportional flow valve system, in accordance with an embodiment.

Referring to FIG. 1, in one embodiment, is an overview of a model 100 for control of a proportional flow valve system in a ventilator. The model includes a closed loop flow controller 110, and an adaptive controller 120. As shown in FIG. 1, the closed loop flow controller 110 includes a proportional flow control valve 140 that controls flow from a gas source 130, a flow sensor 150, and an integral compensator with adjustable gain 180. The adaptive controller 120 includes a model 160 of the closed loop flow controller, and a gain control 170.

According to an embodiment, and as described in detail below, the closed loop flow controller 110 initiates gas flow from the gas source 130 by actuating the proportional flow valve 140. The flow sensor 150 measures the actual gas flow created by actuation of the proportional flow valve. The closed loop flow controller then determines the difference between a desired gas flow, which can be a predetermined value, and the gas flow measured by the flow sensor. The closed loop flow controller can then use that difference to adjust control of the proportional flow valve.

The adaptive controller 120 utilizes the desired flow rate value to initiate a response from the model 160 of the closed loop flow controller. For example, the adaptive controller feeds the desired flow rate into the model of the closed loop flow controller, and the response of the closed loop flow control model is provided to the gain control 170 together with the actual gas flow measured by flow sensor 150. The gain control utilizes the response of the model and the actual gas flow to determine a gain. That gain is then utilized to adjust the gain of the closed loop flow controller.

Figure 2:
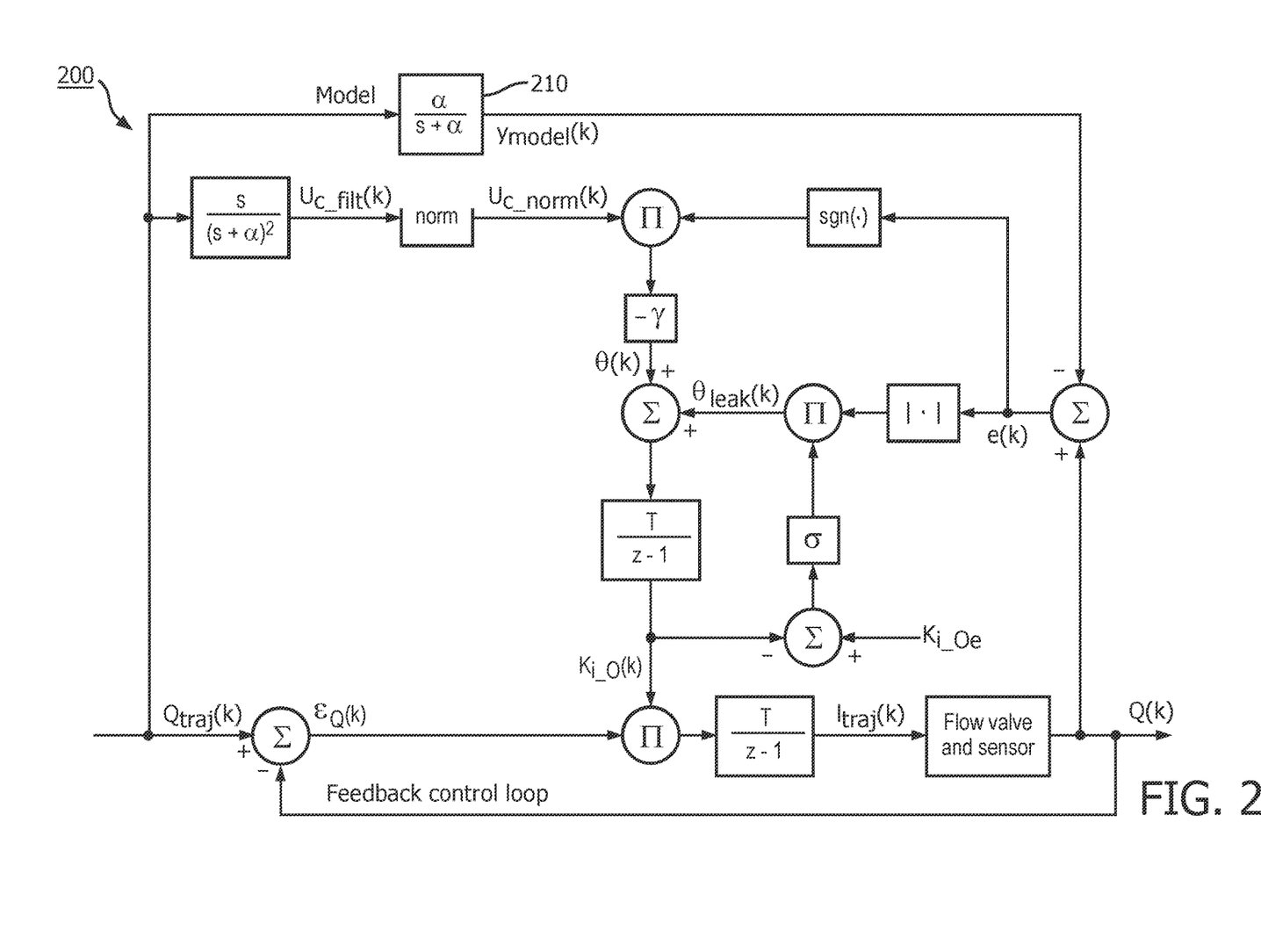
FIG. 2 is a schematic representation of a model for controlling a proportional flow valve system, in accordance with an embodiment

Referring to FIG. 2, in one embodiment, is a model 200 for control of a proportional flow valve system. Model 200 is similar to model 100 in FIG. 1, but provides additional details. Model 200 includes a simple linear dynamic model 210 of the desired closed loop flow control system. Model 200 also includes an adjustment mechanism that minimizes the difference between the dynamic model and the actual flow control loop by real time adjustment of the control loop gain. The method can also include one or more constraints that limit the rate of gain, or leakage, and range of gain, or limiters, in order to provide global stability.

According to the model in FIG. 2, the goal of the controller and system is to have the actual flow output, $Q(k)$ (or equivalently 'plant' response, $y_p$) closely track the flow trajectory $Q_{traj}(k)$ despite variation in flow valve sensitivity (K) at different flows. According to an embodiment, the system response ($y_p$) is compared to the response of the model ($y_m$ or $y_{model}(k)$,) to provide a tracking error (e) where:

$$e = y_p - y_m \quad \text{(Eq. 1)}$$

The system then uses that information to change one or more adjustable parameters, such as θ, in real time such that the tracking error is minimized. According to an embodiment, the model is selected as a first order lag with α=30 Hz to match the structure of the valve (considered a constant gain at any given flow) in closed loop feedback with an integrator as the compensator, and with a closed loop cutoff frequency of 30 Hz.

Figure 3:
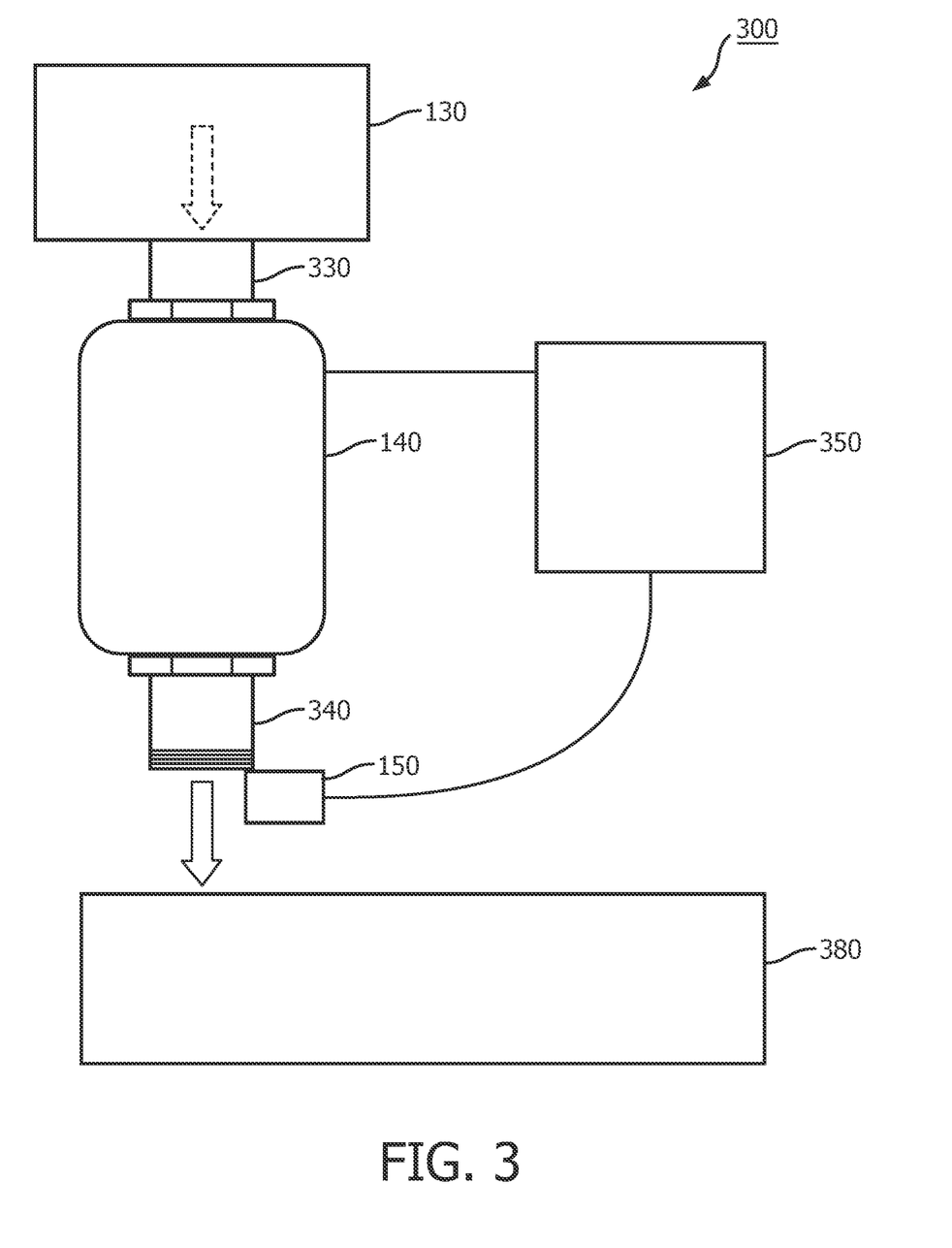
FIG. 3 is a schematic representation of a proportional flow valve system in accordance with an embodiment.

Referring to FIG. 3, a system 300 for controlling gas flow by a proportional flow valve is provided in accordance with an embodiment. The system includes a proportional flow valve 140, which may be any proportional flow valve known in the art. Many different types of proportional flow valves exist, including screw-type proportional flow valves, electromagnetic proportional flow valves, and many other types of proportional flow valves. Any of these valves may be utilized in the system 300. The system also includes a gas source 130. The gas source can be any gas source that might be utilized, such as a compressed source of surrounding environmental air, an oxygen tank, a nitrogen tank, mixtures thereof, as well as a wide variety of other gas sources. There is no requirement that the gas be breathable by humans, and thus the gas source could be toxic, flammable or other gases. Gas from gas source 130 exits the gas source via 330, and exits through outlet 340, if proportional flow valve 140 is at least partially open. Proportional flow valve 140 controls the amount of gas that exits the gas source, as well as the rate at which the amount of gas exits the gas source.

The system includes a controller 350, which is a conventional microprocessor, an application specific integrated circuit (ASIC), a system on chip (SOC), and/or a field-programmable gate arrays (FPGA), among other types of controllers. A controller may be implemented with or without employing a processor, and also may be implemented as a combination of dedicated hardware to perform some functions and a processor (e.g., one or more programmed microprocessors and associated circuitry) to perform other functions. The controller 350 can be coupled with or otherwise in communication with any needed memory, power supply, I/O devices, control circuitry, and/or other devices necessary for operation of the system according to the embodiments described or otherwise envisioned herein. For example, in various implementations, a processor or controller may be associated with one or more storage media. In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

Although controller 350 is shown as being separate from proportional flow valve 140 in FIG. 3, according to other embodiments the controller can be attached to the exterior of the valve, can be an integral component of the valve, completely remote from the valve, or in some other physical relationship with the valve. In the case where the controller is remote from the valve, communication can be transmitted wirelessly between the controller and the valve.

Controller 350 controls proportional flow valve 140, and thus controls the amount of gas that exits the gas source, as well as the rate at which the amount of gas exits the gas source. The controller can be directed by an external source such as a user, and/or can be directed by programming. For example, a user can push a button or provide some other input indicating that the flow should increase, and the controller receives that signal and provides a signal to the proportional flow valve to increase the flow. Alternatively, the controller or an associated processor is programmed or configured to reduce or increase flow according to a specific time, response, or other input.

System 300 also includes a flow sensor 150. The flow sensor detects the flow of gas after it exits the proportional flow valve 140. Accordingly, the flow sensor is a measurement of the effectiveness of the proportional valve; in other words, based on the flow sensor measurements, a calculation can be obtained of how effectively and precisely the proportional flow valve arrived at a desired flow. As described in great detail herein, feedback from flow sensor 150 is used by controller 350 to adjust the proportional flow valve 140 to arrive at the desired flow. To do this, the gas flow as measured by flow sensor 150 (which is $y_p$) is compared to a desired output which has been dictated to the controller 350 by a user or by programming (which is $y_m$). The difference between $y_m$ and $y_p$ is the error (e). The controller uses the value of e to change one or more adjustable parameters, such as θ, of the proportional flow valve and model in real time such that the tracking error is minimized. In other words, the adaptive controller utilizes e to make changes to the integral gain in the closed loop flow controller which in turn adjusts the proportional flow valve. If flow response of the closed loop control is either too fast or too slow, the adaptive control adjusts the integral gain such that the closed loop response of the plant matches the response of the model.

According to an embodiment, the proportional flow valve system 300 is a component of a ventilator 380, as shown in FIG. 3. Accordingly, the output 340 can be tubing that leads to the patient. The controller of the system can be a component of the ventilator or can be a separate component.

Figure 4:
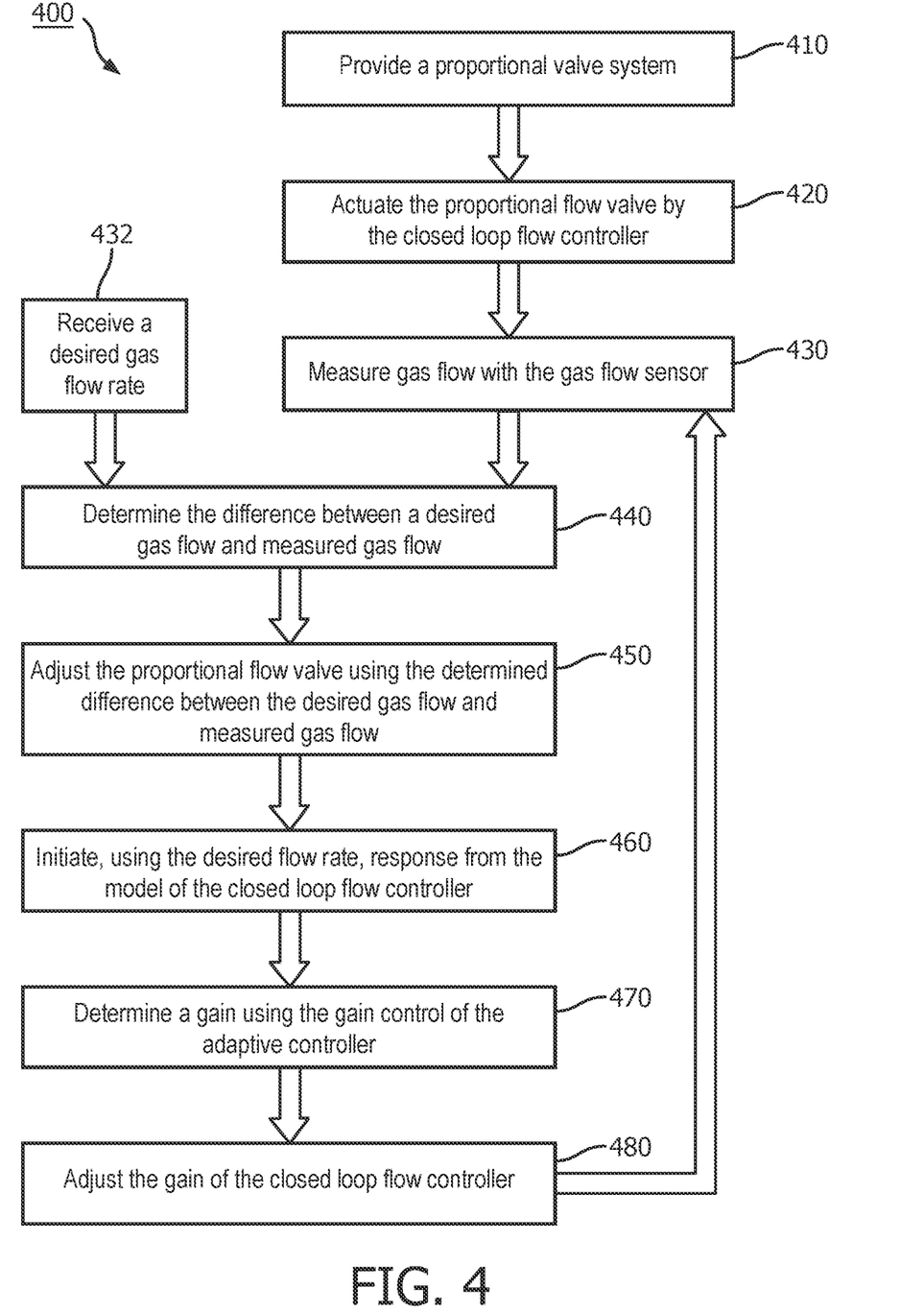
FIG. 4 is a flowchart of a method for controlling a proportional flow valve system, in accordance with an embodiment.

Referring to FIG. 4, in one embodiment, is a flowchart of a method 400 for controlling a proportional flow valve system. At step 410, a proportional flow valve system 100 is provided. The proportional flow valve system can be any of the embodiments described or otherwise envisioned herein. For example, proportional flow valve system 100 includes a closed loop flow controller 110 with a proportional flow control valve 140 for a gas source 130, a flow sensor 150, and an integral compensator with adjustable gain 180. The proportional flow valve system 100 also includes an adaptive controller 120 with a model 160 of the closed loop flow controller, and a gain control 170. Many other embodiments of the proportional flow valve system are also possible.

At step 420 of the method, the closed loop flow controller 110 initiates gas flow by actuating the proportional flow valve 140.

At step 430 of the method, the actual gas flow ($y_p$) created by actuation of the proportional flow valve is measured by a flow sensor 150, such as the flow sensor depicted in FIG. 1 or 3. The flow sensor is preferably close to the proportional flow valve to avoid errors caused by delay in measurement.

At step 440 of the method, the closed loop flow controller compares the actual gas flow rate measured by flow sensor 150 ($y_r$) to the desired flow rate ($y_m$) in order to obtain the error (e), which is the difference between $y_m$ and $y_p$. The desired flow rate can be selected or provided, for example, by a user or by programming. For example, at step 432 of the method, the system receives a desired gas flow rate.

At step 450, closed loop flow controller adjusts the proportional flow valve based on the scaled, integrated difference between the desired flow rate ($Q_{traj}$) and the actual gas flow rate ($y_p$), as described below in greater detail.

At step 460 of the method, the adaptive controller 120 utilizes the desired flow rate value, $Q_{traj}$, to initiate a response, $y_m$, from the model 160 of the closed loop flow controller. For example, the adaptive controller feeds the desired flow rate into the model of the closed loop flow controller to obtain the model's response.

At step 470 of the method, a gain is determined by the gain control of the adaptive controller. For example, the response of the closed loop flow controller model, $y_m$, is provided to the gain control 170 together with the actual gas flow measured, $y_p$, by flow sensor 150. The gain control utilizes the response of the model, the response of the gas flow of the actual closed loop flow controller, and the desired flow trajectory to determine the closed loop flow controller gain.

At step 480 of the method, the gain of the closed loop flow controller is adjusted according to the gain calculated by the adaptive controller.

According to an embodiment, the method employs one or more of the following variables and units: Q(k) is the valve flow measurement of oxygen or air in lpm; $Q_{traj}$(k) is the flow servomechanism trajectory of oxygen or air in lpm; $I_{traj}$(k) is the valve electrical current trajectory in counts; $K_{aQ}$ is the antiwindup gain in 1/sec; $I_{traj\_max}$ is the valve current corresponding to saturated maximum valve flow at inlet 50 psig of oxygen or air, in counts; $I_{traj\_min}$ is the valve current corresponding to saturated minimum valve flow (or liftoff current) at inlet 50 psig of oxygen or air, in counts; $K_{i\_e}$(k) is the automatically adjustable integral gain, in counts/lpm-sec; $K_{i\_\theta min}$ is the minimum integral gain in counts/lpm-sec; $K_{i\_\theta max}$ is the maximum integral gain in counts/lpm-sec; $y_{model}$(k) is the reference model flow servomechanism output in lpm; $y_{plant}$(k) is the flow servomechanism output (i.e., the actual output) in lpm; e(k) is the reference model tracking error in lpm; $\varepsilon_Q$(k) is the flow servomechanism error in lpm; $\alpha$ is the flow servomechanism loop model pole in rad/sec; $I_{sum}$(k) is the servomechanism loop integrator output; $I_{sum\_init}$ is the servomechanism loop integrator reset and initial value in counts; $I_{reset}$(k) is the controller reset signal; $U_{c\_filt}$(k) is the filtered flow trajectory in lpm/sec; $\delta$ is the normalization factor in lpm²/sec²; $\gamma$ is the adaptation rate gain; a is the adaptation leakage gain; $K_{i\_\theta e}$, is the leakage affinity set point in counts/lpm-sec; and $K_{i\_\theta init}$ is the Adaptive gain integrator reset and initial value in counts/lpm-sec.

According to an embodiment, the method employs the following constant values, although the values could be modified or otherwise adjusted to satisfy certain requirements of the system, different valves, and a variety of other systems. However, pursuant to one embodiment, $\alpha$=50; a=4; $\delta$=0.00005; $\gamma$=3000; $K_{aQ}$=10; $K_{i\_\theta e}$=8000; $K_{i\_\theta init}$=10,000; $K_{i\_\theta min}$=8000; $K_{i\_\theta max}$=70000; $I_{sum\_init}$=$I_{traj\_min}$. According to an embodiment of the method, $I_{traj\_max}$ and $I_{traj\_min}$ are both determined for each valve (both air and $O_2$) during a system services valve calibration procedure.

According to an embodiment of the method, the following equations are utilized to derive the system, including a closed loop transfer function (Eq. 2) and the method model (Eq. 3):

$$y_p = \frac{K\theta}{s + K\theta} u_c \qquad (Eq.\ 2)$$

$$y_m = \frac{\alpha}{s + \alpha} u_c \qquad (Eq.\ 3)$$

$$e = \left[\frac{K\theta}{s + K\theta} - \frac{\alpha}{s + \alpha}\right] u_c \qquad (Eq.\ 4)$$

According to an embodiment, in order to minimize tracking error a cost function, J, is selected as a function of the adjustable parameter. The cost function is chosen as the absolute value of the tracking error, and thus J≥0:

$$J(\theta) = |e(\theta)| \qquad (Eq.\ 5)$$

According to an embodiment, the change in the adjustable gain with respect to time is chosen to be proportional to the change in cost with respect to the adjustable gain. Furthermore since J≥0, this relationship can be stabilized by choosing the constant of proportionality to be negative, so $\gamma$>0. Gamma ($\gamma$) controls the rate at which adaptation converges in the final synthesis of the control law:

$$\frac{d\theta}{dt} = -\gamma \frac{\partial J}{\partial \theta} \qquad (Eq.\ 6)$$

$$\frac{\partial J}{\partial \theta} = \frac{\partial}{\partial \theta} |e| = \text{sgn}(e) \frac{\partial e}{\partial \theta} \qquad (Eq.\ 7)$$

$$\frac{\partial e}{\partial \theta} = \frac{\delta}{\delta \theta}\left(\left[\frac{K\theta}{s + K\theta} - \frac{\alpha}{s + \alpha}\right] u_c\right) = \frac{Ks}{(s + K\theta)^2} u_c \qquad (Eq.\ 8)$$

$$\frac{d\theta}{dt} = -\gamma' \text{sgn}(e)\left[\frac{s}{(s + K\theta)^2} u_c\right] = -\gamma' \text{sgn}(e)\left[\frac{s}{(s + \alpha)^2} u_c\right] \qquad (Eq.\ 9)$$

$\gamma' = K\gamma$
$K\theta \to \alpha$ steady state

According to an embodiment, the control law is the following, where 'sgn' is the signum function. This equation assumes $K\theta \sim \alpha$ is at steady state, however this will not be the case as the algorithm converges. Indeed, the control law in this form is not stable:

$$\theta = \int \left(-\gamma \cdot \text{sgn}(e)\left(\frac{s}{(s + \alpha)^2} u_c\right)\right) \qquad (Eq.\ 10)$$

Accordingly, normalization of the filtered input is required for stability. This effectively divides by the size of the filtered input rather than normalizing, and results in a larger contributing factor for small changes in target and a smaller factor for large changes. Notably, $\delta$ is just a small factor to prevent division by zero, however the choice does affect gain evolution for small $u_f$.

$$u_f = \frac{s}{(s + \alpha)^2} u_c \qquad (Eq.\ 11)$$

$$u_N = \frac{u_f}{\delta + (u_f)^2} \qquad (Eq.\ 12)$$

This results in a stable model that effectively controls a proportional flow valve system at a variety of output rates, including rapid changes among those variable output rates.

Compressed Gas Valve Flow Controller

According to an embodiment, the reference model output is updated using a generalized discrete time first order filter defined below with the following equations:

$$x(k) = Q_{traj}(k) \quad \text{(Eq. 13)}$$

$$y(k) = y_{model}(k) \quad \text{(Eq. 14)}$$

where $\alpha=0.0$; $b=\alpha$; $c=1.0$; $d=60$; and $\Delta T=0.001$ sec.

A first order lead lag filter can serve as a generalized filter (low pass, high pass, lead lag, PI filter, etc.) by appropriate choice of the filter parameters as represented in the continuous time transfer function by a, b, c, and d. Cascading multiple filters can further provide band pass and band stop filter constructions. The derivation of the discrete time filter begins with the continuous time transfer function:

$$\frac{Y(s)}{X(s)} = \frac{as+b}{cs+d} \quad \text{(Eq. 15)}$$

where X is the input and Y is the output. Note that 's' is the operator representing complex frequency, $\sigma+j\omega$, and for this filter the pole is at d/c rad/sec and the zero is at b/a rad/sec. The DC gain of this filter is a/c.

A mapping from continuous time to discrete time (z-domain) is accomplished using the bilinear transformation and the following substitution of operators $$s \rightarrow \frac{2}{\Delta T}\frac{z-1}{z+1} \quad \text{(Eq. 16)}$$

This substitution results in a z-transform which in turn provides the means of obtaining a difference equation for the filter since $z^{-1}$ is the delay operator and $z^{-1}F(z) \rightarrow f(k-1)$. The filter becomes:

$$y(k) = \alpha x(k) + \beta x(k-1) + \gamma y(k-1) \quad \text{(Eq. 17)}$$

$$\alpha = \frac{2a+b\Delta T}{2c+d\Delta T}, \beta = \frac{b\Delta T - 2a}{2c+d\Delta T}, \gamma = \frac{2c-d\Delta T}{2c+d\Delta T} \quad \text{(Eq. 18)}$$

where x(k) is the filter input and y(k) is the filter output. $\alpha$, $\beta$ and $\gamma$ are the discrete time filter coefficients determined by the continuous time filter coefficients, a, b, c, and d and the discrete time sample interval, $\Delta T$.

According to an embodiment, at a next step the flow servomechanism error is updated using the formula:

$$\varepsilon_Q(k) = Q_{traj}(k) - Q(k) \quad \text{(Eq. 19)}$$

According to an embodiment, at a next step the reference model tracking error is updated using the formula:

$$e(k) = y_{model}(k) - Q(k) \quad \text{(Eq. 20)}$$

According to an embodiment, at a next step the filtered flow trajectory is updated using a second order band pass filter defined below, where $x(k)=Q_{traj}(k)$; $y(k)=U_{c\_filt}(k)$; $\omega_{low}=\omega_{high}=\alpha$; and $\Delta T=0.001$ sec.

The band pass filter passes signal with unity gain between two −3 dB cutoff frequencies: $\omega_{low}$ and $\omega_{high}$ and attenuates signal for $\omega>\omega_{high}$ and $\omega<\omega_{low}$. The filter is realized by cascading in series two filter stages: a high pass filter and a low pass filter. The filters use the cutoff frequencies and sample interval, $\Delta T$ as the design input. Each of the filter stages can be realized using the generalized filter.

The high pass filter serves as the first stage, providing the low frequency cutoff and the low pass the second stage providing the high frequency cutoff. To realize the high pass filter using the generalized lead lag, the lead lag filter zero is selected to be zero and the pole selected to be $\omega_{low}$. To realize the low pass filter using the generalized lead lag, the lead lag filter zero is at infinity and the pole is at $\omega_{high}$. So to achieve the desired band pass filter, the following is applied: first, let the band pass filter input be u(n) and the output be v(n).

First Stage (Generalized Filter as High Pass):

For high pass with cutoff at $\omega_{low}$: $\alpha=1/\omega_{low}$; $b=0$; $c=1/\omega_{low}$, and $d=1$. And set the following:

$$\alpha = \frac{2}{2+\omega_{low}\Delta T}, \beta = \frac{-2}{2+\omega_{low}\Delta T}, \gamma = \frac{2-\omega_{low}\Delta T}{2+\omega_{low}\Delta T}$$

Additionally, set the generalized filter input for this stage, x(n) to the band pass filter input, u(n); and the generalized filter output for this stage y(n) is connected to the input of the second stage.

Second Stage (Generalized Filter as Low Pass):

For low pass with cutoff at $\omega_{high}$: $\alpha=0$; $b=1$; $c=1/\omega_{high}$; and $d=1$. And set the following:

$$\alpha = \frac{\omega_{high}\Delta T}{2+\omega_{high}\Delta T}, \beta = \frac{\omega_{high}\Delta T}{2+\omega_{high}\Delta T}, \gamma = \frac{2-\omega_{high}\Delta T}{2+\omega_{high}\Delta T}$$

Additionally, set the generalized filter input for this stage, x(n) to the output of the first stage, and the generalized filter output for this stage y(n) is the band pass filter output, v(n).

According to an embodiment, at a next step the normalized filtered flow trajectory, $U_{c\_norm}(k)$, is updated using the following equation:

$$U_{c\_norm}(k) = \frac{U_{C\_filt}(k)}{\delta + U_{C\_filt}^2(k)} \quad \text{(Eq. 21)}$$

According to an embodiment, at a next step the leakage component of the gain integrator input, $\theta_{leak}(k)$, is updated using the following equation:

$$\theta_{leak}(k) = |e(k)|\sigma(K_{i\_\theta e} - K_{i\_\theta}(k)) \quad \text{(Eq. 22)}$$

According to an embodiment, at a next step the remaining component of the gain integrator input, $\theta(k)$, is updated using the following equation:

$$\theta(k) = -\gamma \cdot sgn(e(k)) \cdot U_{c\_norm}(k) \quad \text{(Eq. 23)}$$

where the signum function, sgn(x), is defined as $$sgn(k) = \begin{cases} -1 & \text{for } x < 0 \\ 0 & \text{for } x = 0 \\ 1 & \text{for } x > 0 \end{cases} \quad \text{(Eq. 24)}$$

According to an embodiment, at a next step the integral gain is updated. If $I_{reset}(k)$ is clear (0) then the following equation is utilized:

$$K_{i\_\theta}(k)=\min(K_{i\_\theta max},\max(K_{i\_\theta min},(\Delta T(k-1)+\theta_{leak}(k-1))+K_{i_\theta}(k-1)))) \quad \text{(Eq. 25)}$$

or else the following equation is utilized:

$$K_{i\_\theta}(k)=K_{i\_\theta init} \quad \text{(Eq. 26)}$$

where the initial conditions are:

$$K_{i\_\theta}(0)=K_{i\_\theta init} \quad \text{(Eq. 27)}$$

$$\theta(0)=\theta_{leak}(0)=0 \quad \text{(Eq. 28)}$$

According to an embodiment, at a next step the flow servomechanism integrator output is updated. If $I_{reset}(k)$ is clear (0) then the following equation is utilized:

$$I_{sum}(k)=\Delta TK_{i\_\theta}(k-1)\varepsilon_Q(k-1)+K_{aQ}\Delta T(I_{traj}(k-1)-I_{sum}(k-1))+I_{sum}(k-1) \quad \text{(Eq. 29)}$$

or else the following equation is utilized:

$$I_{sum}(k)=I_{sum\_init} \quad \text{(Eq. 30)}$$

where the initial conditions are:

$$\varepsilon_Q(0)=0 \quad \text{(Eq. 31)}$$

$$I_{traj}(0)=I_{sum\_init} \quad \text{(Eq. 32)}$$

According to an embodiment, at a next step the flow servomechanism output is updated using the following formula:

$$I_{traj}(k)=\min(I_{traj\_max},\max(I_{traj\_min},I_{sum}(k)))$$

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A method for controlling a proportional flow control valve, the method comprising:
    providing a proportional flow control valve system, the system comprising:
    (i) a closed loop flow controller having a proportional flow control valve, a flow sensor, and an adjustable gain; and
    (ii) an adaptive controller comprising a model of the closed loop flow controller, and a gain control, wherein the model of the closed loop flow controller comprises a high pass filter configured to provide a low frequency cutoff and a low pass filter in series configured to provide a high frequency cutoff;

actuating, by the closed loop flow controller, the proportional flow control valve; measuring, by the flow sensor, actual gas flow;

determining, by the closed loop flow controller, a difference between the measured gas flow rate and a desired gas flow rate;

adjusting the proportional flow control valve using the determined difference;

initiating, using the desired gas flow rate, a response from the model of the closed loop flow controller;

determining, using the actual gas flow, the desired flow, and the response from the model of the closed loop flow controller, a gain for the closed loop flow controller; and adjusting, using the determined gain, the adjustable gain of the closed loop flow controller proportional to a change in cost of a cost function with respect to the adjustable gain, wherein adjusting the adjustable gain of the closed loop flow controller decreases the difference between the response from the model of the closed loop flow controller and the measured gas flow rate.

2. The method of claim 1, further comprising: receiving a desired gas flow rate.

3. The method of claim 1, wherein the proportional flow control valve system is a component of a ventilator.

4. The method of claim 1, wherein the gas is oxygen.

5. A proportional flow control valve system, the system comprising:
  a gas source;
  a proportional flow control valve configured to control a gas flow rate from the gas source;
  a flow sensor configured to measure a flow of gas from the proportional flow control valve;
  a closed loop flow controller comprising an adjustable gain, wherein the closed loop flow controller is configured to determine a difference between a measured gas flow rate and a desired gas flow rate, and further configured to adjust the proportional flow valve using the determined difference; and
  an adaptive controller comprising a model of the closed loop flow controller, and a gain control, the model of the closed loop flow controller comprising a high pass filter configured to provide a low frequency cutoff and a low pass filter in series configured to provide a high frequency cutoff, wherein the adaptive controller is configured to determine a response from the model of the closed loop flow controller, and an adjustment factor for the closed loop flow controller using the gain control, the desired gas flow rate, and the response from the model of the closed loop flow controller, and the closed loop flow controller is further configured to adjust the adjustable gain using the adjustment factor proportional to a change in cost of a cost function with respect to the adjustable gain, and wherein adjusting the adjustable gain of the closed loop flow controller decreases the difference between the response from the model of the closed loop flow controller and the measured gas flow rate.

6. The proportional flow control valve system of claim 5, wherein the closed loop flow controller is further configured to receive input indicating the desired gas flow rate.

7. The proportional flow control valve system of claim 5, wherein the gas is oxygen.

8. The proportional flow control valve system of claim 5, wherein the proportional valve system is a component of a ventilator.

9. A ventilator, the ventilator comprising:
  a gas source;
  a proportional flow control valve configured to control a gas flow rate from the gas source;
  a flow sensor configured to measure a flow of gas from the proportional flow control valve; and
  a closed loop flow controller comprising an adjustable gain, wherein the closed loop flow controller is configured to determine a difference between a measured gas flow rate and a desired gas flow rate, and further configured to adjust the proportional flow valve using the determined difference; and
  an adaptive controller comprising a model of the closed loop flow controller, and a gain control, the model of the closed loop flow controller comprising a high pass filter configured to provide a low frequency cutoff and a low pass filter in series configured to provide a high frequency cutoff, wherein the adaptive controller is configured to determine a response from the model of the closed loop flow controller, and further configured to determine an adjustment factor for the closed loop flow controller using the gain control, the desired gas flow rate, and the response from the model of the closed loop flow controller, wherein the closed loop flow controller is further configured to adjust the adjustable gain proportional to a change in cost of a cost function with respect to the adjustable gain, and wherein adjusting the adjustable gain of the closed loop flow controller decreases the difference between the response from the model of the closed loop flow controller and the measured gas flow rate.

10. The ventilator of claim 9, wherein the closed loop flow controller is further configured to receive input indicating the desired gas flow rate.

* * * * *